United States Patent
Linzer

(10) Patent No.: US 6,463,102 B1
(45) Date of Patent: Oct. 8, 2002

(54) DIGITAL VIDEO COMPRESSOR WITH BORDER PROCESSOR

(75) Inventor: Elliot Linzer, Bronx, NY (US)

(73) Assignee: Harmonic, Inc., Sunnyvale, CA (US)

( * ) Notice: Subject to any disclaimer, the term of this patent is extended or adjusted under 35 U.S.C. 154(b) by 0 days.

(21) Appl. No.: 09/315,923

(22) Filed: May 20, 1999

Related U.S. Application Data

(60) Provisional application No. 60/099,836, filed on Sep. 11, 1998.

(51) Int. Cl.[7] .................................................. H04N 7/12
(52) U.S. Cl. ............................ 375/240.29; 375/240.24; 375/240.27; 348/241
(58) Field of Search ....................... 375/240.29, 240.24, 375/240.12, 240.26, 240.27; 348/420.1, 425.1, 425.2, 425.3, 409.1, 416.1, 241, 252, 575, 604, 606, 608, 625; 382/165, 199, 268, 269, 275

(56) References Cited

U.S. PATENT DOCUMENTS

| | | | | |
|---|---|---|---|---|
| 5,251,028 A | * | 10/1993 | Iu ............................... | 348/400 |
| 5,552,823 A | * | 9/1996 | Kageyama ................... | 348/155 |
| 5,699,123 A | * | 12/1997 | Ebihara et al. .............. | 348/445 |
| 5,802,213 A | * | 9/1998 | Gardos ........................ | 382/239 |
| 5,819,035 A | * | 10/1998 | Devaney et al. ............. | 709/202 |
| 6,115,503 A | * | 9/2000 | Kaup ........................... | 382/268 |
| 6,125,146 A | * | 9/2000 | Frencken et al. ....... | 375/240.24 |
| 6,259,809 B1 | * | 7/2001 | Maruo ......................... | 382/151 |
| 6,275,615 B1 | * | 8/2001 | Ida et al. ..................... | 382/232 |

OTHER PUBLICATIONS

Lynch et al., "Edge compensated transform coding", ICIP '94, vol. 1, pp. 105–109, Nov. 1994.*

* cited by examiner

*Primary Examiner*—Vu Le
(74) *Attorney, Agent, or Firm*—Proskauer Rose LLP

(57) ABSTRACT

In one embodiment, an edge or border processor modifies the undisplayed edges of an uncompressed video input signal before it is applied to a compression engine. This configuration reduces the number of bits used in the compression process. The undisplayed edges of the video signal are modified either by being turned black, by blurring, or by copying, depending on the application. As an aspect of this embodiment, the edge processing functions are integrated into the compression engine or video encoder. In another embodiment, edges of the uncompressed video input signal are not preprocessed prior to encoding the signal. Instead, a video encoder includes a motion estimator with special edge processing that, e.g., uses only zero motion vectors for edge macroblocks. Further, the video encoder includes a quantization processor having a special edge processor. In either embodiment, the configuration of the output bit stream is compatible with the MPEG-2 standard.

22 Claims, 6 Drawing Sheets

DIGITAL VIDEO COMPRESSOR WITH BORDER PROCESSOR

This application claims priority from provisional application Ser. No. 60/099,836, filed Sep. 11, 1998.

FIELD OF THE INVENTION

The present invention relates to the process of encoding video data. More specifically, the present invention relates to an MPEG-2 compliant video encoder with special border processing.

BACKGROUND OF THE INVENTION

The function of an MPEG-2 compliant video encoder is to receive a digital video signal from a video source, such as a video camera, and to utilize a compression algorithm to generate an MPEG-2 compliant bit stream from an input sequence of frames. (See ISO/IEC 13818-2).

An MPEG-2 bit stream is made up of various layers of syntax, which include a Group of Pictures (GOP) layer and a macroblock and block layer, among others. A GOP is a set of frames which starts with an I-frame, and includes a certain number of P and B frames. Each frame is divided into macroblocks. Illustratively, a macroblock comprises four luminance blocks and two chrominance blocks. Each block is 8×8 pixels.

An MPEG-2 video encoder will encode an I-frame, for example, in the following manner. Each 8×8 block of pixels in a macroblock undergoes a discrete cosine transform (DCT) to form an 8×8 array of transform coefficients. These transform coefficients are then quantized and scanned (e.g., using zig-zag scanning) to form a sequence of DCT coefficients. The DCT coefficients are then encoded using a variable length code.

A simplified block diagram of an MPEG-2 video encoder 100 is shown in FIG. 1. (For simplicity, many components of a conventional MPEG encoder have been omitted from FIG. 1). A motion estimator 110 receives current frame macroblocks (uncompressed video) from a video source, and also receives encoded reference frames from a reference frame memory 120. Motion estimator 110 then determines motion vectors, which describe the translation of macroblocks in a current frame relative to previously encoded reference frames. The motion vectors are used to "motion compensate" each macroblock. That is, a predicted macroblock is formed by combining the reference frames with the motion vectors in a motion compensator 130. The predicted macroblock is then subtracted from the current macroblock to reduce the information in the macroblock. This motion compensated macroblock then undergoes a DCT transform in a DCT processor 140, and the resultant DCT coefficients are then quantized in a quantization processor 150. Finally, the quantized DCT coefficients and the motion vectors are encoded by a variable length encoder 160, and are outputted as a compressed bit stream.

A digital video signal consists of both active and inactive regions. The active region contains the actual picture. The inactive region above the active region is referred to as the vertical blank, and the inactive regions to the left and right of the active region are referred to as the horizontal blanks.

In some applications, parts of the inactive region are used to carry non-video data, such as 'closed caption'. Typically, however, most of the inactive region is simply black.

A conventional video encoder will encode a region that includes not only most or all of the active pixels, but also some of the inactive pixels. These inactive pixels are typically encoded in order to encompass an integer multiple of macroblocks. This situation is illustrated in FIG. 2.

Normally, when an encoded video signal is decoded and displayed, not all of the decoded pixels are visible. This situation is illustrated in FIG. 3. Clearly, the process of encoding video which is not visible is an inefficient "waste" of bits. Accordingly, it is an object of the present invention to improve the efficiency of the encoding process by reducing or eliminating such bit waste.

It is a further object of the present invention to reduce or eliminate the wasted bits in compliance with the MPEG-2 standard.

SUMMARY OF THE INVENTION

These and other objects of the present invention are achieved by the present invention. In accordance with an illustrative embodiment of the present invention, an apparatus for efficiently compressing a digital video signal includes an edge processor and a video encoder. The edge processor receives the digital video signal and processes the edges of the video signal before applying it to the video encoder. That is, the edge processor may change at least one edge of the digital video signal to a solid color, preferably black. Alternately, the edge processor may blur at least one edge of the digital video signal. In a third variation, the edge processor may copy at least one pixel column of the digital video signal to a left edge or a right edge of the signal, or may copy at least one pixel row of the digital video signal to a top edge or a bottom edge of the signal.

The edge processed signal is then fed into the video encoder, which compresses the signal by conventional means. The compressed output bit stream is compatible with the MPEG-2 standard.

An illustrative embodiment of the present invention is more fully described below in conjunction with the following drawings.

BRIEF DESCRIPTION OF THE DRAWINGS

The following is a description of an embodiment of the present invention that when taken together with the following drawings will demonstrate the above noted features and advantages, as well as further ones. It should be expressly understood that the drawings are included for illustrative purposes and do not represent the scope of the present invention. The invention is best understood in conjunction with the accompanying drawings in which.

DETAILED DESCRIPTION OF THE INVENTION

Figure 1:
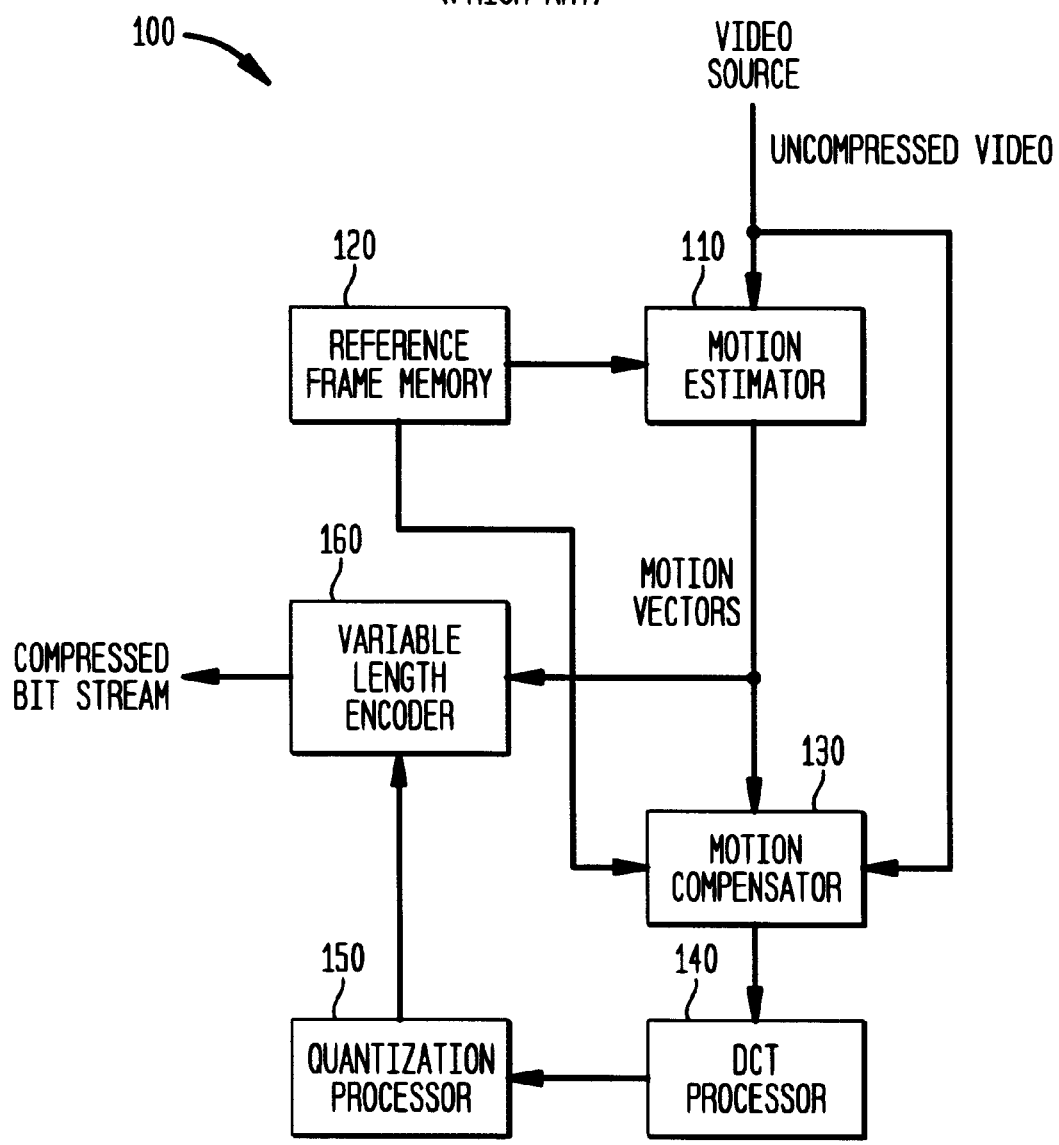
FIG. 1 is a simplified block diagram of a conventional MPEG-2 video encoder.
Figure 2:
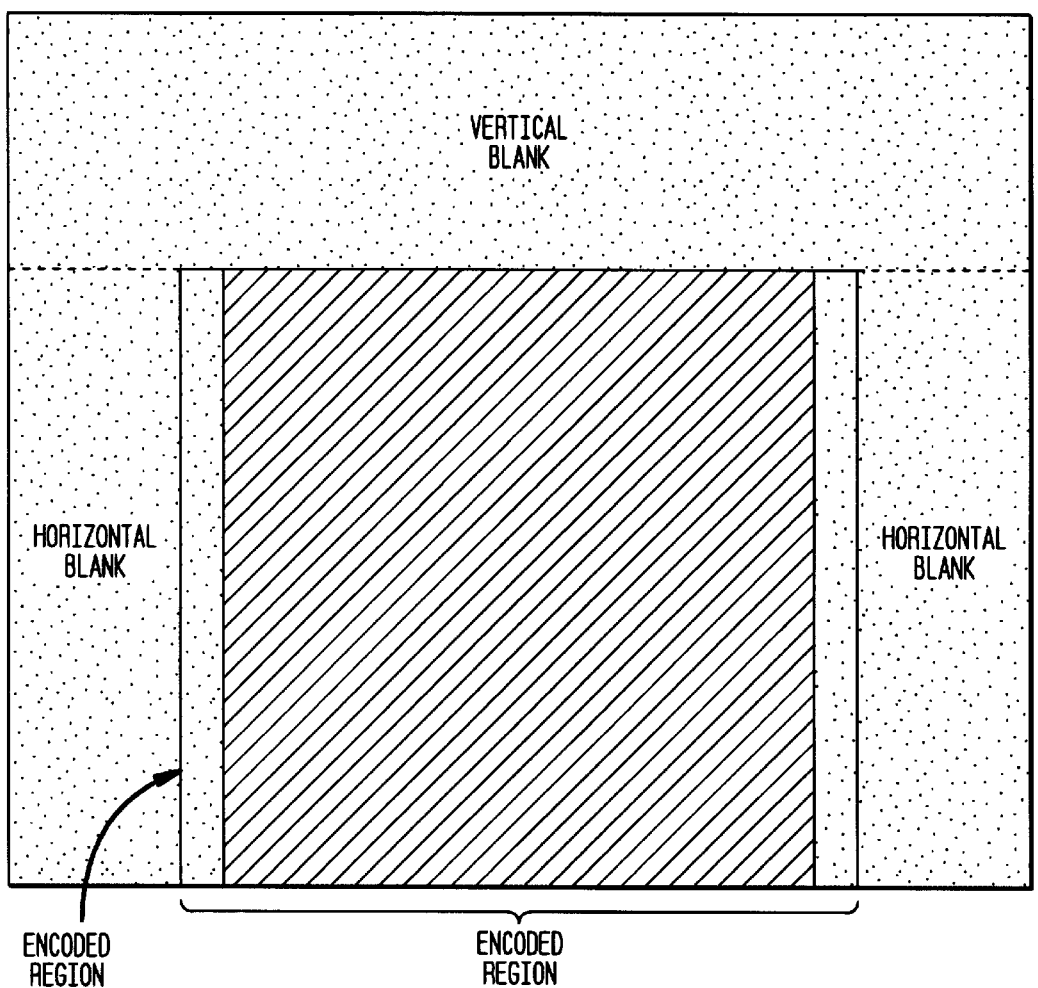
FIG. 2 depicts active and inactive pixels within an encoded region.
Figure 3:
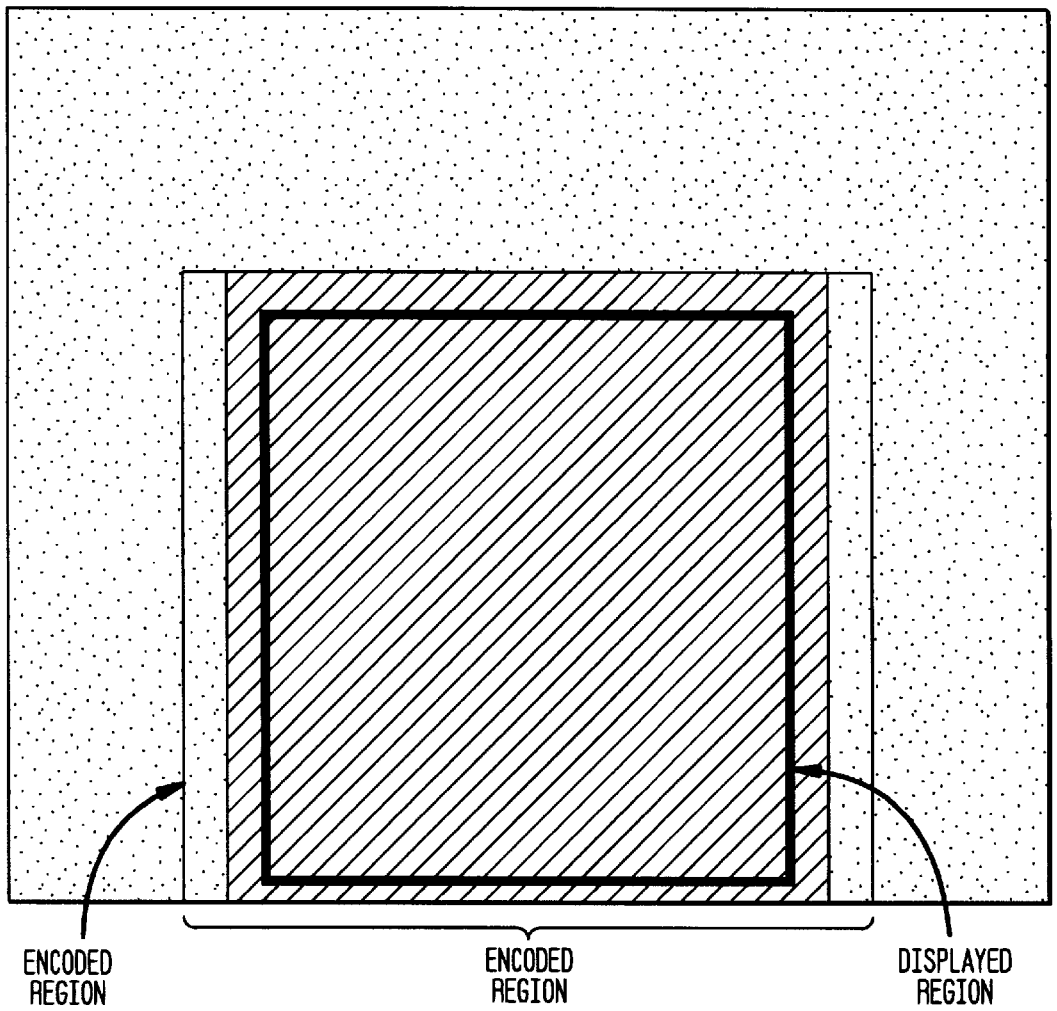
FIG. 3 shows a displayed region within an encoded region.
Figure 4:
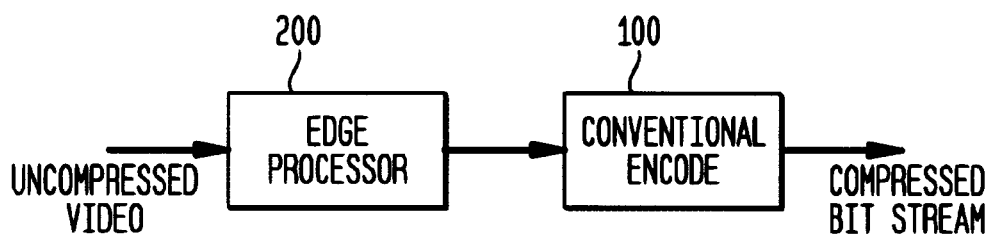
FIG. 4 is a simplified block diagram of an edge processor and conventional video encoder, in accordance with a first embodiment of the present invention.

In accordance with one embodiment of the present invention, as shown in FIG. 4, an edge processor 200 is interjected between the uncompressed video input and the conventional video encoder 100 of FIG. 1. Edge processor 200 processes the edges of the uncompressed video signal, such that fewer bits will be required in the encoding process. This edge-processed video is then sent to conventional encoder 100, which compresses the bit stream in the manner described above.

Figure 5:
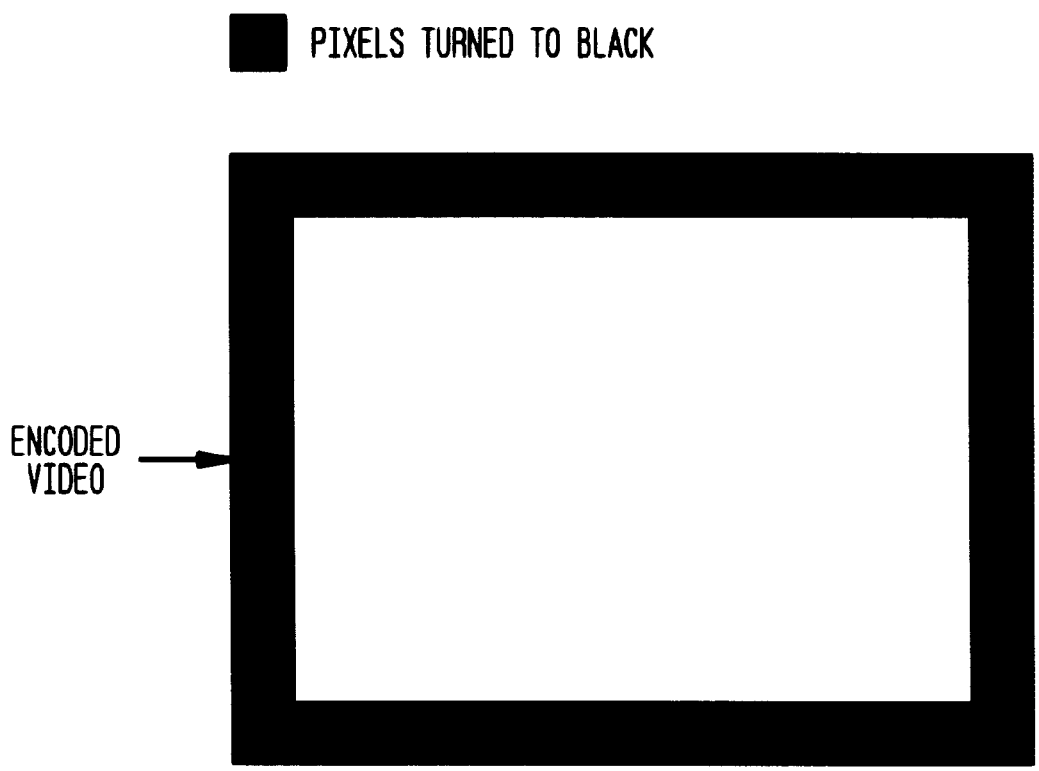
FIG. 5 illustrates the effect of an edge processor which turns the edge pixels black.

Illustratively, a preferred type of edge processing is one in which the pixels on the edge of the video signal are turned black. This type of processing is depicted in FIG. 5. Preferably also, the number of black columns inserted on each of the left and right edges, and the number of black rows inserted on the top and bottom edges, are chosen to be a multiple of the DCT block size used. In MPEG-2, for example, the block size is 8. As a result, there will be no edges between the black pixels and the unprocessed video within a block. This is a very desirable condition, since any such edges would require many bits for encoding.

It should be noted that some of the coded video will already be black. That is, inactive pixels are typically black. However, using the inventive edge (border) processor in multiples of DCT block size would still be highly advantageous, since there would otherwise be transitions from black to non-black within the blocks.

For example, assuming a block size=8, if the 12 leftmost columns are black, then the first column of macroblocks will use a large number of bits to encode the transition from black to active video. However, making the entire first 16 columns black will greatly reduce the number of bits used to encode the first macroblock column. Moreover, even if an edge is not black at all, replacing active data with black data will still reduce the number of bits used for the encoding process.

Figure 6:
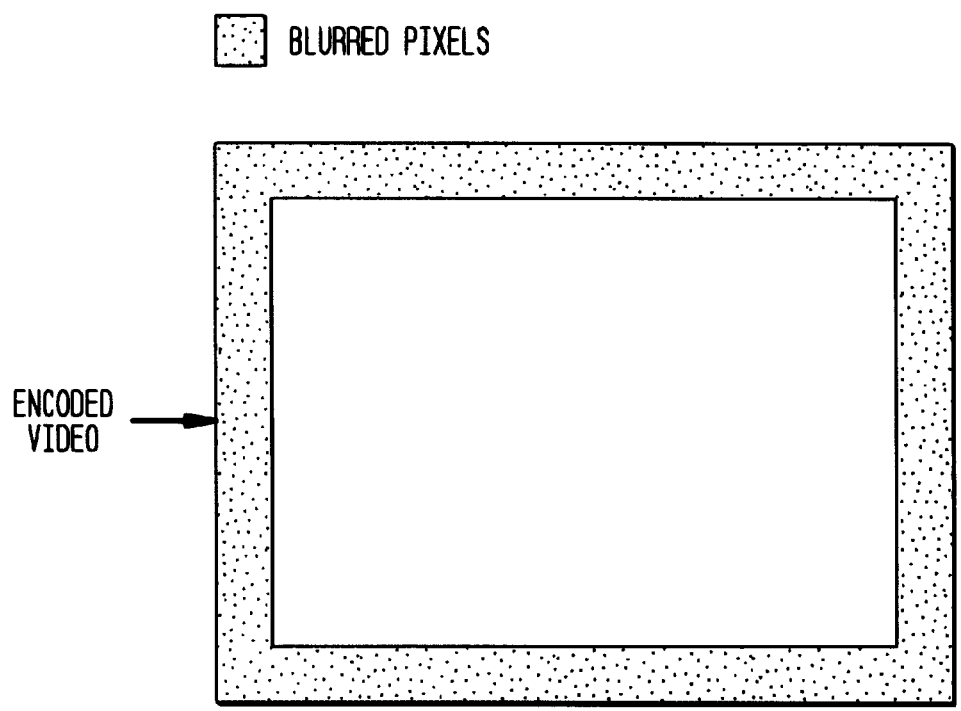
FIG. 6 illustrates the effect of an edge processor which blurs the edge pixels.
Figure 7:
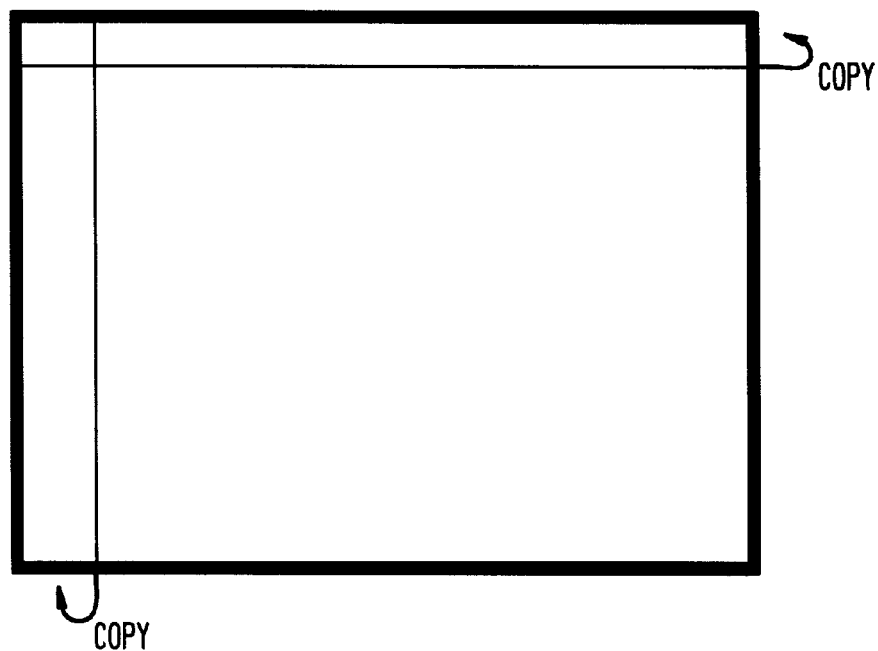
FIG. 7 illustrates the effect of an edge processor which copies the edge pixels.

A second type of processing within the capabilities of the inventive border processor reduces the number of bits used by blurring the edges of an image. This can be achieved, for example, through the use of linear filters. A resultant image with blurred edges is illustrated in FIG. 6.

A third type of processing within the capabilities of the inventive border processor reduces the number of bits used by copying a row or column of pixels multiple times on the edge of an image. For example, the fifth pixel column from the left may be copied over the first four pixel columns from the left, the third pixel column from the right may be copied over the first two pixel columns from the right, the sixth pixel row from the top may be copied over the first five pixel rows from the top, and so on.

Where the number of columns or rows processed is a multiple of the block size, turning the edges black, as in the above described preferred process, is generally the most effective technique. However, where the number of columns or rows processed is not a multiple of the block size, blurring the edges or copying columns and/or rows are the preferred processes.

Figure 8:
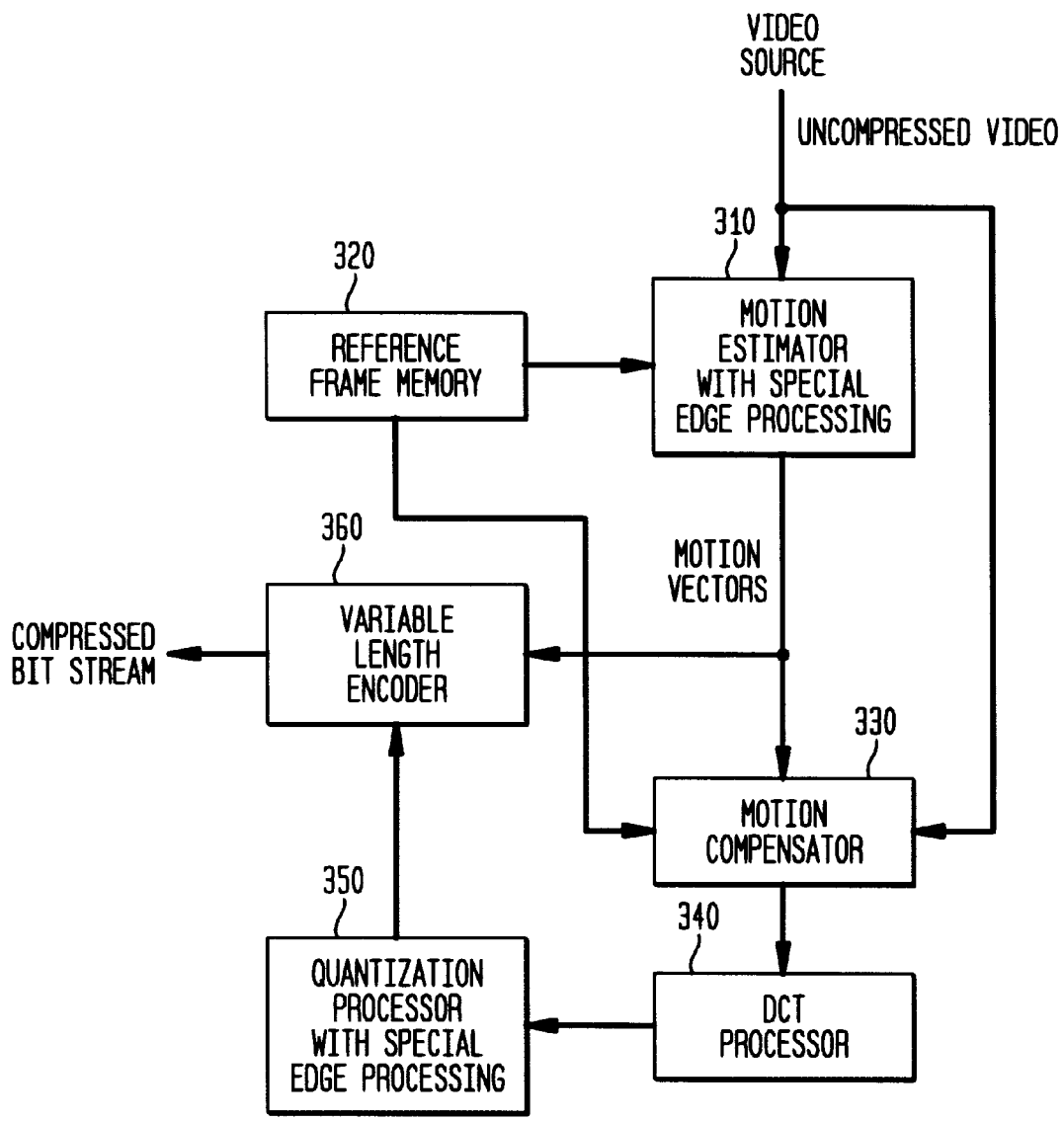
FIG. 8 is a simplified block diagram of a video encoder with internal edge processing functions, in accordance with a second embodiment of the present invention.

A second embodiment of the present invention is shown in simplified block diagram form in FIG. 8. In this embodiment, the edges of the video signal are not processed before the uncompressed video signal is encoded. Rather, the encoding process itself is different for the edge macroblocks. (An edge macroblock is a macroblock that is in one of the first few or last few columns or rows of macroblocks. Typically, only the first or last 1–3 rows and/or columns of macroblocks will receive special treatment.)

In this second embodiment, a video encoder 300 includes a motion estimator with special edge processing 310. Preferably, the special edge processor within motion estimator 310 uses only zero motion vectors for the edge macroblocks.

The quantization processor 350 within video encoder 300 also includes a special edge processor. In this case, the quantization_scale_code is preferably set higher for an edge macroblock. Alternately, a subset or all of the DCT coefficients may simply be set to zero for an edge macroblock.

The other blocks within video encoder 300 (320, 330, 340, 360) all perform the same functions as described above for FIG. 1.

In short, edge processing apparatus and method embodiments are disclosed which reduce or eliminate bit waste when encoding video macroblocks. Moreover, the disclosed techniques are fully compliant with MPEG-2 standards.

The above described embodiments of the invention are intended to be illustrative only. Numerous alternative embodiments may be devised by those skilled in the art without departing from the spirit and scope of the following claims.

What is claimed is:

1. An apparatus for compressing a digital video signal, comprising:

an edge processor for processing at least one edge of an inactive region of said digital video signal, wherein each of said at least one edge is one of a top edge, bottom edge, left edge and right edge of said digital video signal; and a video encoder for receiving the edge processed digital video signal, wherein said video encoder compresses said edge processed digital video signal.

2. The apparatus of claim 1, wherein said edge processor changes said at least one edge of said digital video signal to a solid color.

3. The apparatus of claim 2, wherein said solid color is black.

4. The apparatus of claim 1, wherein said edge processor blurs said at least one edge of said digital video signal.

5. The apparatus of claim 1, wherein said edge processor redundantly copies at least one pixel column of said digital video signal to at least one of a left edge and right edge of said at least one edge of said digital video signal.

6. The apparatus of claim 1, wherein said edge processor redundantly copies at least one pixel row of said digital video signal to at least one of a top edge and bottom edge of said at least one edge of said digital video signal.

7. The apparatus of claim 1, wherein compression of said digital video signal is compatible with the MPEG-2 standard.

8. An apparatus for compressing a digital video signal, comprising:

a motion estimation unit having first and second modes of operation, wherein said motion estimation unit being operable in said first mode for estimating edge macroblocks, wherein said edge macroblocks are located at an inactive region of at least one of a top edge, bottom edge, left edge and right edge of said digital video signal, wherein said motion estimation unit being operable in said second mode for estimating non-edge macroblocks, and wherein said first mode is different from said second mode.

9. The apparatus of claim 8, wherein said first mode requires the selection of zero motion vectors.

10. The apparatus of claim 8, wherein compression of said digital video signal is compatible with the MPEG-2 standard.

11. An apparatus for compressing a digital video signal, comprising:

a quantization unit, having first and second modes of operation, for quantizing transform coefficients, wherein said quantization unit being operable in said first mode for estimating edge macroblocks, wherein said edge macroblocks are located at an inactive region of at least one of a top edge, bottom edge, left edge and right edge of said digital video signal, wherein said quantization unit being operable in said second mode for estimating non-edge macroblocks, and wherein said first mode is different from said second mode.

12. The apparatus of claim 11, wherein said first mode of operation requires a coarser quantization step size than said second mode.

13. The apparatus of claim 11, wherein said first mode of operation forces to zero at least a subset of said transform coefficients.

14. The apparatus of claim 11, wherein compression of said digital video signal is compatible with the MPEG-2 standard.

15. A method for compressing a digital video signal, comprising the steps of:

a) preprocessing the edges of said digital video signal, wherein said edge macroblocks are located at an inactive region of at least one of a top edge, bottom edge, left edge and right edge of said digital video signal; and b) compressing said edge processed digital video signal.

16. The method of claim 15 wherein compression of said digital video signal is compatible with the MPEG-2 standard.

17. A method for compressing a digital video signal, comprising the steps of:

determining motion vectors in a first mode for edge macroblocks, wherein said edge macroblocks are located at an inactive region of at least one of a top edge, bottom edge, left edge and right edge of said digital video signal; and determining motion vectors in a second mode for non-edge macroblocks, wherein said first mode is different from said second mode.

18. The method of claim 17, wherein compression of said digital video signal is compatible with the MPEG-2 standard.

19. A method for compressing a digital video signal, comprising the steps of:

quantizing transform coefficients in a first mode for edge macroblocks, wherein said edge macroblocks are located at an inactive region of at least one of a top edge, bottom edge, left edge and right edge of said digital video signal; and quantizing transform coefficients in a second mode for non-edge macroblocks, wherein said second mode is different from said first mode.

20. The method of claim 19, wherein compression of said digital video signal is compatible with the MPEG-2 standard.

21. An apparatus for compressing a digital video signal, comprising:

an edge processor for processing at least one edge of said digital video signal; and a video encoder for receiving the edge processed digital video signal, wherein said video encoder compresses said edge processed digital video signal, and wherein said edge processor redundantly copies at least one pixel column of said digital video signal to at least one of a left edge and right edge of said at least one edge of said digital video signal.

22. An apparatus for compressing a digital video signal, comprising:

an edge processor for processing at least one edge of said digital video signal; and a video encoder for receiving the edge processed digital video signal, wherein said video encoder compresses said edge processed digital video signal, and wherein said edge video processor redundantly copies at least one pixel row of said digital video signal to at least one of a top edge and bottom edge of said at least one edge of said digital video signal.

* * * * *